United States Patent [19]
Sammak et al.

[11] 4,138,518
[45] Feb. 6, 1979

[54] TEXTILE COMPOSITE AND METHOD FOR MAKING SAME

[75] Inventors: Emil G. Sammak; Douglas J. Ladish, both of Dover, Del.; John J. Martin, Hixon, Tenn.; Claire D. LeClaire, Dover, Del.

[73] Assignee: Reichhold Chemicals, Inc., White Plains, N.Y.

[21] Appl. No.: 857,905

[22] Filed: Dec. 6, 1977

Related U.S. Application Data

[63] Continuation-in-part of Ser. No. 634,013, Nov. 21, 1975, abandoned.

[51] Int. Cl.² ............... B05D 3/02; B32B 25/10; B32B 25/16

[52] U.S. Cl. .................... 428/95; 260/17.4 ST; 427/381; 427/390 R; 428/97; 428/96; 428/246; 428/245

[58] Field of Search .................... 428/95, 97, 96; 628/246, 245; 260/17.4 ST; 427/381, 390 R

[56] References Cited

U.S. PATENT DOCUMENTS 3,779,857 12/1973 Hadgraft et al. ............ 428/246
4,055,694 10/1977 Hadgraft et al. ............ 428/95

Primary Examiner—Michael R. Lusignan

[57] ABSTRACT

A textile composite is formed utilizing a latex composition formulated with granular starch dispersed uniformly throughout. The composite is subjected to suitable heating or drying conditions to gelatinize substantially all the starch particles thereby imparting to the composite improved cohesiveness.

15 Claims, 9 Drawing Figures

OVEN TEMPERATURE SETTING
121°C

TEXTILE COMPOSITE AND METHOD FOR MAKING SAME

This application is a continuation-in-part of application Ser. No. 634,013 entitled "TEXTILE COMPOSITE AND APPARATUS FOR MAKING THE SAME", filed Nov. 21, 1975, now abandoned.

BACKGROUND OF THE INVENTION

The term "latex" was originally applied to aqueous dispersions of natural rubber. This term is now used in the art to refer to aqueous dispersions of natural rubber, aqueous dispersions of synthetic polymers, such as elastomeric polymers, and mixtures thereof.

Latex has a wide variety of uses in the textile field. For instance, latex can be used for laminating textiles, e.g., carpeting. In the manufacture of carpeting, particularly tufted carpeting, it is the general practice to coat the back of the carpet with a latex formulation. In this case the coating acts as an adhesive to secure the tufts in place so that they are not pulled out in normal use. A secondary fabric backing or layer is sometimes applied to carpeting. Materials used for this purpose are woven jute, or a woven or non-woven textile made of such synthetic materials as polypropylene, rayon, viscose, nylon, polyester, acrylics or mixtures thereof. The principal purpose of this secondary backing or layer is to provide additional dimensional stability and stiffness to the carpet. The secondary layer is generally laminated to the carpet by the use of a latex formulation or composition.

The latex-starch composition used in the present method may be applied in the manufacture of tufted carpets and other composite textile such as woven carpets; upholstery fabrics; curtaining fabrics; needlefelt carpets; lightweight laminated fabrics including apparel fabrics; and non-woven fabrics, for such purpose as providing improved weight, handle, drape or opacity to the composition textile, in addition to improved strength and durability and dimensional stability.

The rheological behavior of a latex composition is quite important in regard to the properties that such will impart to a textile composite. For instance, if the viscosity of the composition is excessive, the latex will not penetrate sufficiently into the textile to provide the desired adhesiveness between the tufts and the primary backing and among the fibers of the tufting thread. On the other hand, if the viscosity of the latex is too low, excessive penetration through the textile takes place so that latex is not disposed at a point where it will provide the desired degree of adhesiveness to the secondary backing. In the textile field, the penetration capability of a latex is referred to as "ride." A latex which is considered to give a "high ride" is one which will not penetrate excessively into or through the weave of a textile fabric but will, nevertheless, flow sufficiently into the interstices of the textile to provide the desired adhesive strength.

A latex composition which is to be utilized for forming a textile composite must develop adhesiveness as early in the drying curing process as possible to minimize displacement of the secondary backing through mechanical movement. This property is generally referred to in the textile art as "early bonding" or "green strength."

A wide variety of latices have been utilized for preparing textile composites. For example, cis-polyisoprene latices, natural rubber latices, mixtures of natural latices with cold SBR latices and other synthetic latices have been used. Carboxylated butadiene-containing latices are quite often used for this purpose since they require little, if any, separate curing agents. Such latices do, however, have to be dried or cured by the application of heat at a temperature below the thermal degradation temperature of the textiles to which they are applied.

Elastomeric or flexible polymers in which the polymer chain contains various functional groups pendant from the chain exhibit the desired low-temperature curability without the addition of other ingredients. Such polymers may be made by the emulsion interpolymerization of a conjugated diene, such as butadiene, with, inter alia, an ethylenically unsaturated functional monomer such as an $\alpha,\beta$-unsaturated carboxylic acid, unsaturated dicarboxylic acids, mono-esters of such dicarboxylic acids, acrylamides and N-methylolacrylamides. In addition to the conjugated diene and the functional monomer, the polymerization mixture may also contain a secondary copolymerizable monomer such as styrene, acrylonitrile, methyl methacrylate, vinylidene chloride and the like.

The relative amount of secondary copolymerizable monomer determines in large part the functional characteristics of the latex and its effect on the textile to which it is applied. A latex composition containing relatively large amounts of secondary monomer will impart a stiff hand to the textile, whereas, a latex containing relatively low amounts of secondary monomer will impart a softer hand, i.e., more flexibility to the laminated textile. It is well within the purview of those skilled in the art to devise a polymer to meet the desired characteristics by adjustment of the amount of secondary monomer. For example, a latex copolymer containing about 45 weight percent styrene monomer may not impart the desired degree of stiffness. On the other hand, a latex copolymer containing about 65 weight percent styrene monomer yields a polymer which may impart stiffness to an undesirable degree. However, these latices may be blended in various proportions to produce a latex mixture which, when applied to a textile, imparts stiffness to an intermediate degree.

Latex compositions used for laminating textiles generally contain large amounts of finely divided inorganic filler such as whiting ($CaCO_3$), barytes, alumina, pigments and the like. These materials are added to impart certain secondary properties such as opacity, fire retardance, stiffness and color.

In addition to the above-referred primary functional components, latex compositions may also contain various additional components such as antioxidants, defoamers, plasticizers, bactericides, emulsifiers, thickeners, dispersants and the like.

U.S. Pat. Nos. 3,779,857 and 4,055,694 disclose granular starch-latex systems useful in the textile field. While these systems provide various benefits, they do not impart the desired degree of cohesiveness to a textile composite.

SUMMARY OF THE INVENTION

This invention relates to a textile composite formed by the utilization of a latex composition. More particularly, this invention relates to a textile composite formed by the utilization of a latex-starch composition.

OBJECTS OF THE INVENTION

It is the principal object of the present invention to provide a textile composite having improved cohesiveness utilizing a latex-starch composition.

It is another object to provide a method of forming a textile composite having improved cohesiveness.

It is still another object to provide an apparatus for forming a textile composite utilizing a latex-starch composition.

DEFINITIONS AND TEST PROCEDURES

The term cohesiveness, as used herein, refers to the ability of the latex-starch composition to maintain the integrity of the composite when such is subjected to disruptive forces. Cohesiveness can be measured in a variety of ways and is defined in terms of the property desired in the textile composite.

phr — refers to parts added per 100 parts latex dry basis phs — refers to parts added per 100 parts starch dry basis phrs — refers to parts added per 100 parts of latex plus starch dry basis Carpet Laminates A level loop, 3 ply acrylic 30 oz./sq. yd., carpet with a woven polypropylene primary is coated with a latex-composition and a jute 8 oz./sq. yd. secondary backing is laminated to the carpet. The laminate is dried, cooled and cut into strips 3 inches wide and T-Peel Bond Strength (also known as "stripback") is determined according to ASTM test procedure D-2724. Results are reported in pounds per 3 inch strip.

Fabric Laminates

Canvas or cotton ticking is coated with latex composition and laminated by folding the fabric so that the latex coated sides are joined together. The laminate is dried, cooled and cut into strips 1 inch wide and T-Peel Bond Strength is determined according to ASTM test procedure D-2724. Results are reported in pounds per one inch strip.

Precoated Carpets

A carpet is prepared as noted above for "Carpet Laminates," except that a secondary jute backing is not applied. Pile anchor (also known as "tuftlock") is determined by ASTM procedure D-1335. Results are reported in the pounds required to pull out one tuft.

Viscosity

Viscosity determinations were made with a Brookfield Synchro-lectric Viscometer with number 5 spindle at a speed of 20 RPM.

DRAWINGS

DETAILED DESCRIPTION OF THE INVENTION

There are a relatively large number of different types of driers presently being utilized in the textile industry. In the commercial manufacture of textile composites, it is generally the practice to dry such to the desired moisture level in the shortest possible period so that the maximum output of the drier can be achieved. The driers may be operated at air temperatures of from about 150° to 260° C.

When a textile composite formed by the utilization of a latex-starch composition is subjected to commonly used textile drying conditions, the starch will not gelatinize and swell uniformly to impart improved cohesiveness to the composite even though gelatinization temperatures for starch are in the range of from about 55° to 70° C, depending upon the particular starch utilized. This is due to the rapid removal of water at the surface at temperatures substantially below the air temperature of the oven by the high velocity heated air. Furthermore, the evaporative cooling effect tends to maintain the latex-starch composition at a temperature substantially below the air temperature of the dryer and may be below the temperature where any substantial degree of gelatinization occurs. The temperature of the composite will rise rapidly when sufficient water is vaporized and then will be above that normally required for gelatinization of the starch. However, at this stage there is generally an insufficient amount of moisture present at the surface to effect gelatinization in the area of the surface layers of the latex composition.

Figure 1:
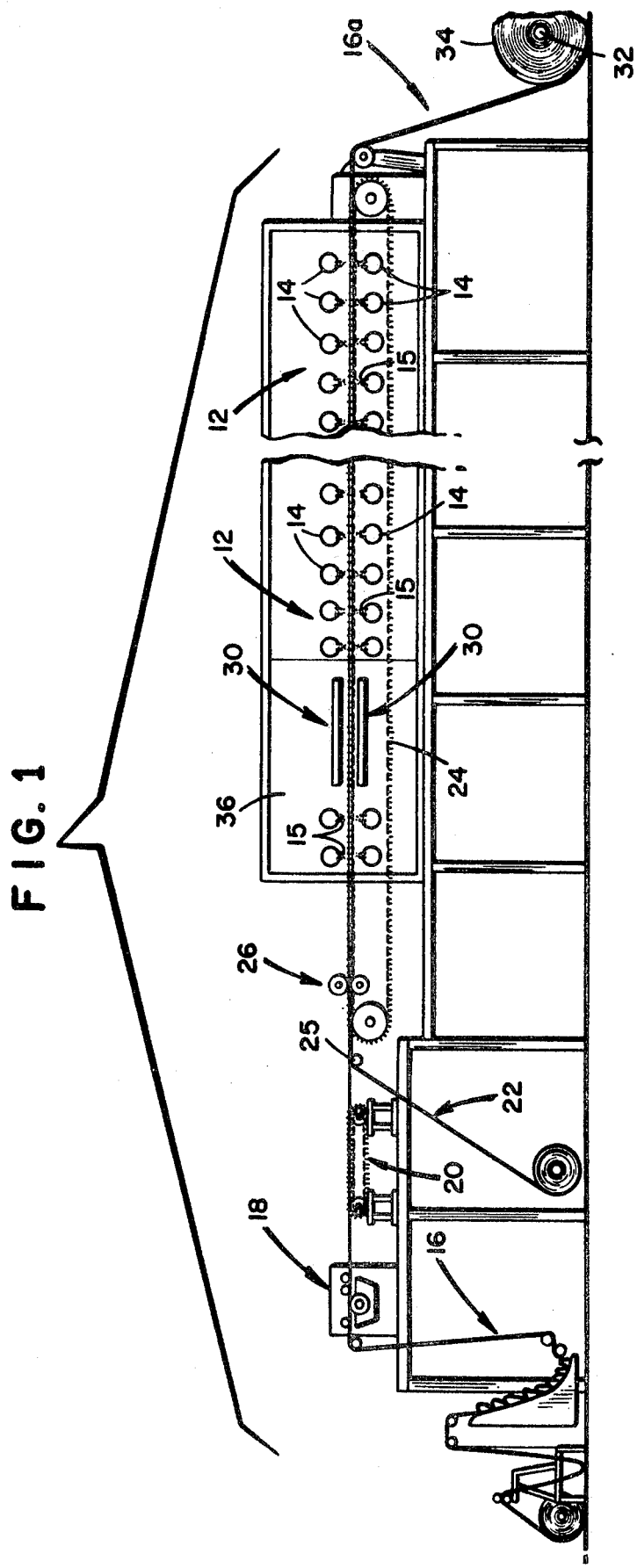
FIG. 1 shows a schematic view of a typical carpet dryer which has been modified to carry out an embodiment of the present invention.

FIG. 1 depicts a typical carpet dryer. The dryer has a plurality of drying chambers 12 into which heated air maintained between 150° and 260° C is introduced through a series of manifolds 14 having air nozzles 15 therein which extend into the drying chambers substantially at right angles to the movement of the carpet 16 being dried as it passes through the dryer. The air nozzles are suitably disposed so that high velocity heated air contacts the top and bottom surfaces of the carpet. The latex-starch composition is passed through a coating station 18 and a layer of the composition is rolled onto the underside of the carpet which is fed continuously into the dryer. The coated carpet then engages a pre-tenter frame 20 and thereafter receives a carpet backing fabric 22, such as jute, which is brought into contact with the coated underside of the carpet and fed onto a moving tenter frame 24 which conveys the carpet through the drier. The tenter frame passes the carpet and its backing fabric through a set of marrying rolls 25 from where the two layers of fabric are pressed together by press rollers 26 to continuously form the composite. After passage through the press rollers, the composite is conveyed by the tenter frame 24 through the drying zones where it is subjected to heated air exiting from air nozzles 15. After drying, the composite is conveyed to take up roller 32 where the finished composite is placed in convenient roll form 34 for further handling.

The above described dryer may be modified for carrying out the present process by providing therein horizontally spaced plates 30 between which the composite is passed after being heated in an initial drying zone 36. These plates reduce the evaporation of water from the composite while maintaining the composite at a temperature sufficient to effect substantially complete gelatinization of the starch. It should be appreciated that other modifications may be made to a typical carpet dryer which would produce similar results. For instance, a wicking pad containing water may be utilized as a replacement or in conjunction with the spaced plates or steam may be applied onto the surfaces of the composite. In fact, any additional means may be utilized in a dryer which provides conditions conducive to the substantially complete gelatinization of the starch.

In an aqueous suspension, native granular starch does not change in appearance when heated until a critical temperature is reached. At or above this critical temperature the starch granules begin to swell rapidly, providing sufficient water is present. This temperature is described as the gelation temperature. The critical temperature is uniquely detected by the loss of the characteristic polarization cross within each granule. The bright polarization cross is observable only under a polarizing light microscope and its disappearance is direct evidence of the destruction of the crystallinity and thus the gelatinization of the starch granule. Individual granules differ slightly in their gelation temperature, but for a particular sample, gelation is generally complete over a temperature range of about 10° C with substantially complete destruction of crystallinity in all of the granules. The temperature range in which the starch gelatinizes is also known as the gelation temperature range and with native corn starch in water is from about 62° C to about 72° C.

When the starch is incorporated in a latex composition and applied to a textile, the dried composite is opaque and so the polarization crosses cannot be readily observed. However, the coating on the composite textile can be stained with iodine after the latex-starch composition has been heated and dried and the starch granules can then be observed as black dots in an optical microscope. It is observed that doubling the diameter of the granules destroys the crystallinity and the polarization cross; in other words an eight fold increase in volume totally destroys the original crystallinity. However an intermediate degree of swelling confers some increase in strength. We have found that when a composite textile coated with latex containing granular starch particles is heated and dried to a temperature and under conditions to cause the starch particles to swell substantially uniformly throughout the thickness of the composite, to at least two and preferably over 4 to 8 times their original volume, the strength and durability of the resulting composite is significantly improved.

Figure 2:
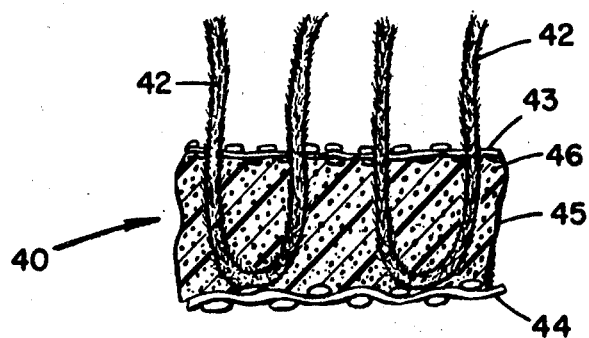
FIGS. 2 to 4 are drawings of cross-sections of a carpet composite having a primary layer tufted with yarn and a secondary layer adhered to the primary layer by a latex-starch composition.
Figure 3:
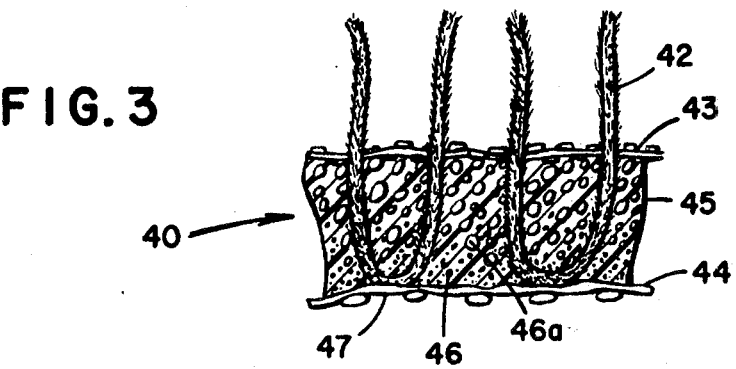
Figure 4:
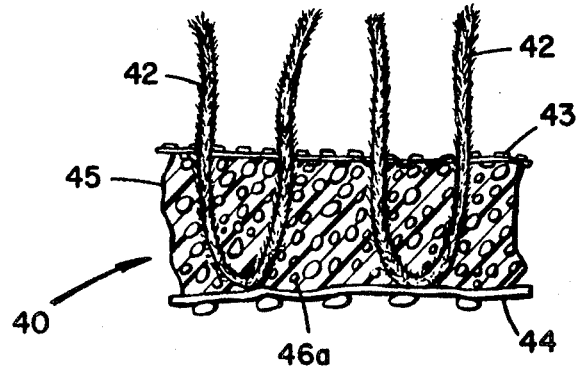

FIGS. 2 to 4 are cross-sectional representations of a carpet composite 40 having a primary layer 43 tufted with yarn 42. A secondary layer 44 is juxtaposed next to the primary layer and is adhered thereto by a latex-starch composition 45. The ungelatinized starch particles are depicted by dots dispersed throughout the composite and by irregular open circles when gelatinized and swollen. In FIG. 2, the starch particles are not gelatinized. Therefore, the starch merely acts as an extender or filler and hence does not impart any cohesiveness to the composite. FIG. 3 depicts a gradation effect in respect to the starch particles, the larger particles being gelatinized and thus swollen. The starch particles are gelatinized to a greater degree in proximity to the primary backing and, thus, greater cohesiveness is imparted to that portion of the composite. This will be manifested by improved tuftlock. In FIG. 4 the starch particles are depicted as being completely gelatinized throughout the composite. Thus, the improved cohesiveness of the entire composite will be manifested by improved tuftlock and strip-back.

As discussed previously, latex compositions utilized for forming textile composites generally contain inorganic fillers. While fillers may impart properties such as weight, opacity, fire retardance, stiffness and color, they generally will decrease the cohesive strength of a textile composite since they are inert in regard to the other ingredients in the latex composition.

Figure 6:
FIGS. 5 and 6 are scanning electron micrographs at a magnification of 1000X of, respectively, corn starch granules and whiting particles.
Figure 5:
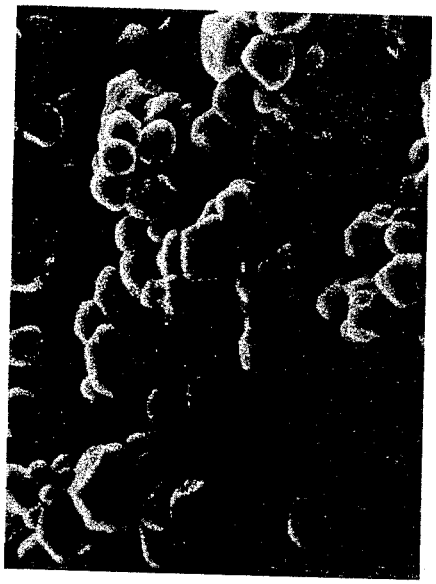

FIGS. 5 through 8 are scanning electron micrographs at a magnification of 1000X. FIGS. 5 and 6 show starch granules and whiting particles, respectively. The whiting particles have sharp angular edges.

Figure 8:
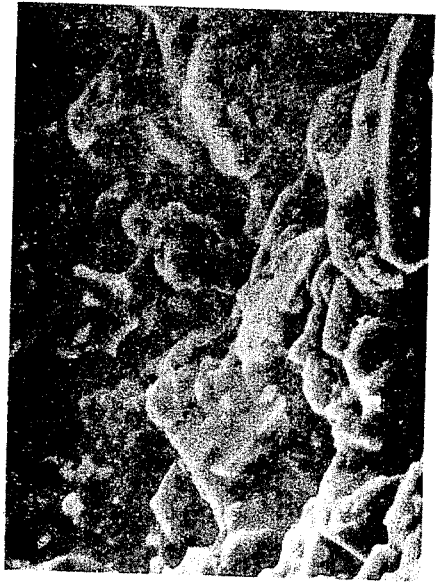
FIGS. 7 and 8 are scanning electron micrographs at a magnification of 1000X of cross-sectional portions of composites.
Figure 7:

FIGS. 7 and 8 are photomicrographs showing cross-sectional portions of composites. These composites were prepared by coating a textile with a latex composition comprising latex, starch and whiting. The textile composite of FIG. 7 was dried for 20 minutes in a circulating hot air oven mantained at a temperature of 140° C. The composite of FIG. 8 was first heated at 100° C for 15 minutes under conditions whereby no substantial moisture loss occurred to insure complete gelatinization of the starch and then dried under the same conditions as the previously mentioned composite. Both composites were then frozen in liquid nitrogen and broken to expose the cross-sections of the same. Comparision of FIGS. 7 and 8 shows that the surface of the composite which was treated to insure gelatinization of the starch had filler particles smoothly coated whereas the surface of the other composite was relatively discontinuous having relatively small rough surfaces, typical of a friable, brittle material. This demonstrates the increased flowability of the latex-starch composition wherein the starch is completely gelatinized and fills the interstices of the composite to coat and bind the filler particles and thus improve the cohesiveness of the resulting dried composite. Moreover, since gelatinized starch is strongly polar, as are the surfaces of the filler particles, there is the tendency for the starch to be attracted to the filler particles and thereby increase the adhesion. The less polar latex polymer presumably has a higher specific adhesion to the fibers. Thus two types of specific adhesion which are made available produce the synergistic improvement in bond strength of the latex-starch composite.

Furthermore, it is well known that blends of certain polymers, can exhibit synergistically improved properties if they are selected so that, on one hand they are sufficiently incompatible as not to form true polymer-polymer solutions but to remain in distinctly separate microscopic domains, and on the other hand, to be sufficiently compatible as to permit the domains of the dispersed phase to be microscopically small with strong bonding at the interfacial surfaces. In this instance, the starch polymer and the latex polymers differ widely in their polar characteristics and are highly incompatible. Obtaining the proper degree of "controlled incompatibility", and particularly the strong interfacial bonding, usually requires elaborate measures and polymers which are relatively similar to each other in polarity and other thermodynamic parameters, or are modified to become so.

With this in mind, we have surprisingly discovered that granular starch polymers and a wide variety of elastomers or other dissimilar latex polymers can be made compatible by the simple expedient of gelatinizing the starch in situ, in the presence of the latex polymers during the course of drying the formulation. With these conditions a compatible polyblend of the two polymers is formed. Such formulations exhibit a reinforcement of the adhesive strength of the latex polymer to fifty percent or more higher than the strength of the original latex polymer alone.

While, as discussed above, it is somewhat difficult to achieve substantially complete gelatinization of starch in a latex-starch composite under commonly used drying conditions, various agents may be used to lower the gelatinization temperature of the starch. These agents will hereinafter be referred to as starch sensitizers. Starch sensitizers are well known in the art and include, for example, the following: alkali metal hydroxides, barium hydroxide, tetramethylammonium hydroxide, benzyltrimethylammonium hydroxide, ethylene diamine, hydrazine hydrate, dimethyl sulfoxide, calcium chloride, sodium silicate, sodium, potassium or ammonium thiocyanate, borax, quaternary fatty amines, sodium xylenesulfonate, lithium bromide, guanidinium chloride, dicyandiamine, sodium lauryl sulfate and Deriphat 160C (product of General Mills; disodium salt of N-lauryl beta iminodipropionate--an amphoteric emulsifier of the class of N-long chain alkyl substituted β-alanine).

The particular sensitizer and the amount thereof used varies depending upon a number of factors such as the amount of starch present, the manner in which the sensitizer is added, the conditions under which the textile composite is heated or dried, the compatibility of the sensitizer with the latex, the particular additives or modifiers contained in the latex formulation, the desired viscosity of the latex formulation, etc.

The rheology of the latex-starch composition is quite important. For instance, if the viscosity thereof is too low or too high, it cannot be handled properly in a commercial textile operation. Starch sensitizers tend to increase the viscosity of latex-starch formulations since, under certain conditions, they will dissolve a portion of the starch and also at sufficiently high concentration may gelatinize the starch at ambient temperatures. When this occurs, the latex-starch composition will be substantially impossible to handle in a commercial operation.

The preferred sensitizer is sodium hydroxide because of its high efficiency at low concentrations, its compatibility with a wide variety of latex compositions, etc. In the case of sodium hydroxide, it is preferred to utilize from about 1 to about 10 parts thereof per 100 phs. The most preferred sensitizer is a mixture of borates and sodium hydroxide. In the case of a mixture of borax and sodium hydroxide, the preferred proportions are from 1 phs to 20 phs of borax and 1 phs to 8 phs of sodium hydroxide. On an equal weight basis, sodium hydroxide will sensitize starch to a lower gelatinization temperature than, for instance, borax. Thus, the finding that a mixture of borax and sodium hydroxide imparts the greatest degree of improvement in cohesiveness of the composite is surprising. It is believed that since borax complexes with the hydroxyl groups of the starch it imparts superior film characteristics to the resultant dried composite.

The order of addition of the borax and sodium hydroxide to the latex-starch composition apparently plays an important role in the degree to which the starch will impart cohesiveness to the dried textile composite. If the sodium hydroxide is added prior to the borax in preparing the composition, the composite has greater cohesiveness than if the reverse order of addition is used.

While the amount of fillers, i.e., whiting ($CaCO_3$), barytes, alumina, clay, pigments and the like, utilized in the present invention may vary over a relatively wide range, for example, up to about 800 phrs, in general, amounts from about 150 to about 600 phrs will be present. The most preferred amount of filler is in the range of from about 360 to about 500 phrs.

The level of starch present in the latex-starch composition may also vary over a relatively wide range depending upon a number of factors such as the type of starch used, the type and amount of sensitizer used, the amount and kind of inert filler present, the particular latex composition, the desired properties of the final composite, etc. Up to 70 phrs starch may be utilized without significantly affecting the cohesiveness of the composite. The preferred amount of starch is from about 20 to 40 phrs. In this range, the greatest improvement in the cohesiveness of the composite is observed while maintaining the desirable properties of the latex polymer in the laminate.

The starch to be used in the composite of the invention must be one which does not result in excessively high viscosity when mixed with the aqueous latex and inorganic filler. Both root and cereal starches may be used so long as they are granular and are essentially cold water insoluble. The starch may be either unmodified or modified as by oxidation, acid treatment, ethoxylation and the like providing the crystal structure of the native granules is not destroyed and the starch gelatinizes when heated. The granular starches may be derived from corn, potato, tapioca, wheat, rice, waxy sorghum, waxy maize, etc. Dextrins may be employed as well so long as the lowering of molecular weight is not so great as to substantially destory its crystallinity or to increase its cold water solubility above about 30 percent (preferably no more than about 20 percent). It is, however, preferred to employ a starch which has been modified by acid treatment or by oxidation. These methods are well known in the art.

Figure 9:
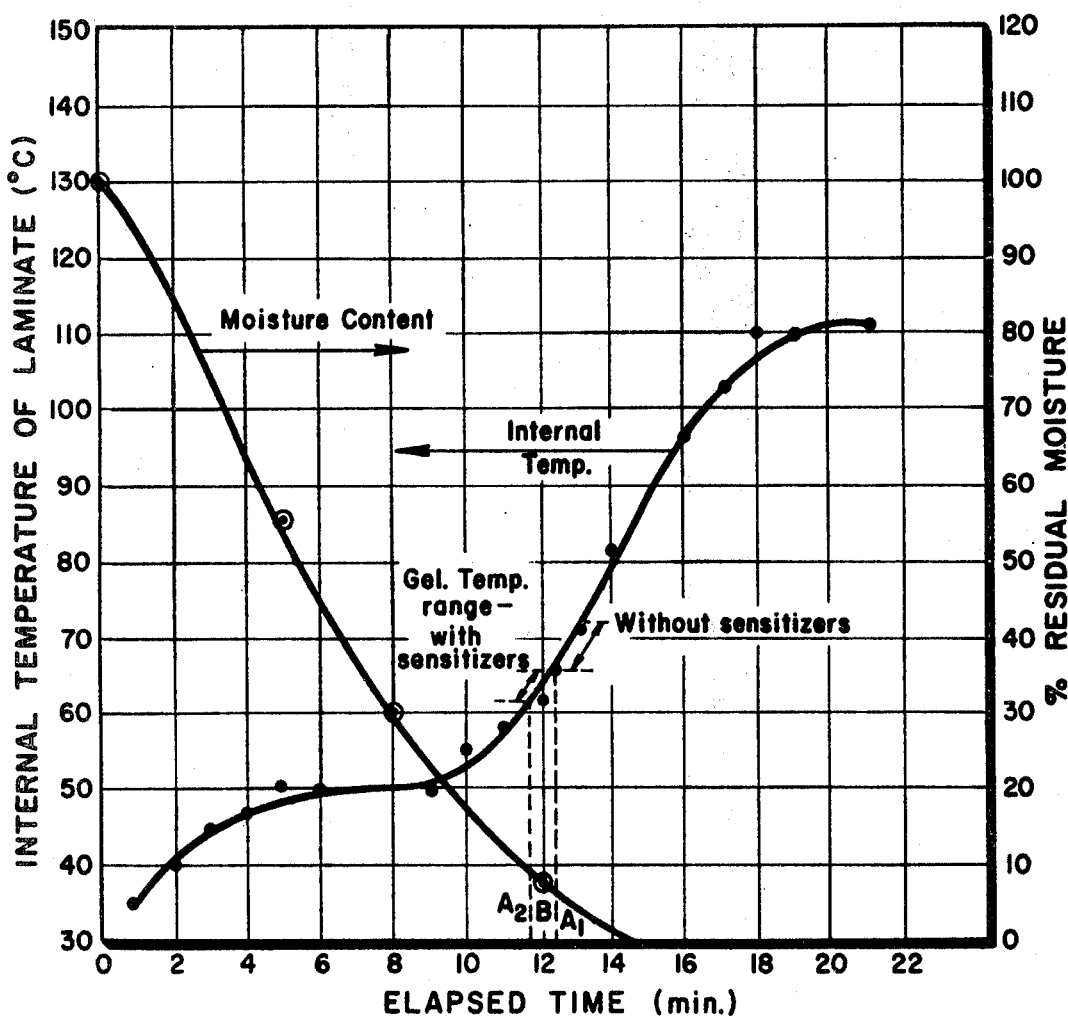
FIG. 9 is a graph which illustrates the critical relationship between the drying temperature of the textile composite and the moisture available to effect gelatinization of the starch.

FIG. 9 is a graph which illustrates the critical relationships between the temperature at which starch is gelatinized in a latex-starch composition and the dynamic conditions of a drying oven.

Although the data depicted in the graph were generated by the utilization of a laboratory circulating air oven which is quite different from the dryers used commercially in the textile field, the data do illustrate certain critical relationships.

A latex-starch composition was prepared containing 80 phrs latex, 20 phrs starch, 400 phrs whiting and sufficient water to obtain a total solids concentration of 70 percent; thus for each 20 g starch there was 214.3 g of water. This composition was coated on a tufted carpet and a secondary jute backing was adhered thereto. Weighed samples of the composite were placed in a laboratory circulating air oven maintained at a temperature of 121° C and at various intervals samples were removed from the oven and weighed to determine their residual moisture.

The internal temperature of the composite was measured at one minute intervals by means of an iron-constantan thermocouple implanted in the latex-starch portion of the composite.

The internal temperature and residual moisture values were plotted vs. time and are graphically depicted in FIG. 9.

If it is assumed that the minimum amount of water which must be present to gelatinize the starch is equal to the weight of the starch, then about 9.3 percent of the original water must be present at a temperature where gelatinization of the starch takes place. This is indicated by B on the Elapsed Time scale. In the absence of starch sensitizers, this was in the range of 67° to 72° C. In the case where a starch sensitizer system comprising 4 phs sodium hydroxide, 14 phs borax, and 20 phs urea is present, gelatinization of the starch would occur in the range of 62° to 67° C. These gelatinization temperature ranges are depicted in FIG. 9 by the double-headed arrows paralleling the temperature curve. The earliest possible time for initiation of gelatinization is indicated by the dotted lines projected vertically from the initial gelatinization temperature to the abscissa (time) and are indicated by $A_1$ and $A_2$. It can be seen from FIG. 9 that without gelatinization sensitizers and under the particular drying conditions used, the minimum temperature of 67° C is not reached until there is less than 9.3 percent of the original moisture present (Time $A_1$). Thus, under these conditions, the cohesiveness of the composite would not be improved. On the other hand, under the same conditions, the presence of gelatinization sensitizers in the latex-starch composition would result in the starch being gelatinized (Time $A_2$). While it might be considered that lowering the minimum gelatinization temperature of starch from 67° to 62° C is only a matter of a few degrees, the graph illustrates that such small differences may greatly affect the cohesiveness of the resulting dried composite.

In order to more clearly describe the nature of the present invention, specific Examples will hereinafter be described. It should be understood, however, that this is done solely by way of example and is intended neither to delineate the scope of the invention nor limit the ambit of the appended claims.

EXAMPLE I

This Example illustrates the preparation of a textile composite comparing a latex-starch adhesive with compositions that contain only latex or only starch. It demonstrates the improved cohesiveness imparted to the laminate by the starch in the presence of added starch sensitizer.

A carboxylated butadiene-styrene latex was prepared by emulsion polymerization methods well known in the art to achieve a monomer conversion of at least 90%. After the completion of the polymerization, the latex was stripped to a polymer solids level of 50 to 55% by weight.

Carpet laminates were coated with 32 oz./sq.yd. (dry weight) of the compositions set forth in Table I below and dried in a circulating air oven for 15 minutes at an air temperature of 140° C. The bond strengths of the laminates were determined and are reported in Table I:

TABLE I

Effect of Latex-Starch on Cohesiveness of Textile Composites

| Composite | Composition* Latex (phrs) | Starch** (phrs) | Sensitizer (phs) NaOH | Borax | Bond Strength (lb./3 in.) |
|---|---|---|---|---|---|
| 1 | 100 | 0 | 0 | 0 | 28.0 |
| 2 | 0 | 100 | 0 | 20 | 1.5 |
| 3 | 0 | 100 | 4 | 0 | 9.8 |

TABLE I-continued

Effect of Latex-Starch on Cohesiveness of Textile Composites

| Composite | Composition* Latex (phrs) | Starch** (phrs) | Sensitizer (phs) NaOH | Borax | Bond Strength (lb./3 in.) |
|---|---|---|---|---|---|
| 4 | 90 | 10 | 4 | 9 | 43.0 |

*Water and polyacrylate thickener were added to obtain 37% solids and a viscosity of 13 to 14,000 cps.
**Acid modified starch (Clinton 155-B manufactured by Clinton Corn Processing Company)

The above table clearly shows the superiority of NaOH as a gelation sensitizer over borax in slurries of granular starch (Composite 3 vs. Composite 2).

In the above data, Composite 4 had increased cohesiveness over Composite 1, demonstrating the synergistic effect obtainable by the proper incorporation of starch in latex.

EXAMPLE II

This example illustrates the utility of sodium hydroxide as a chemical gelation sensitizer for starch and the importance of the order of addition when NaOH and borax are used in the same formulation.

In order to isolate the effect of chemical gelation sensitizers on the adhesive strength of starch, slurries were prepared which contained only acid modified corn starch and various combinations of sodium hydroxide and/or borax. Total solids of the slurries was 37% and the viscosity was adjusted to 13,000–14,000 cps with polyacrylate thickener.

Carpet laminates were prepared as previously described by coating 30 oz./sq. yd. (dry weight) of the slurry onto the back of the carpet.

Bond strength data is illustrated in Table II.

TABLE II

Bond Strength Properties of Starch Containing Chemical Sensitizer-Varying Order of Addition of Chemical Sensitizer

| | Order of Addition (phs) Borax | NaOH | Borax | Bond Strength (lb/3 in) |
|---|---|---|---|---|
| 1 | — | — | — | 0.3 |
| 2 | 10 | — | — | 0.4 |
| 3 | 10 | 4 | — | 3.0 |
| 4 | 20 | 4 | — | 2.7 |
| 5 | — | 4 | 20 | 8.6 |
| 6 | — | 4 | — | 9.0 |

The above data show that the use of sodium hydroxide enhances the adhesive properties of the starch by more than an order of magnitude (Compound 6 vs. 1); that borax alone has minimal effect (Compound 2 vs. 1); that the addition of caustic greatly increases bond strength (Compound 3 vs. 2); and the elimination of borax, (Compound 6), or the addition of borax after the sodium hydroxide has been added (Compound 5), provides a greater enhancement of the adhesive properties of starch than the reverse order of addition of borax and caustic (Compound 4).

EXAMPLE III

This example directly illustrates the effect of increasing amounts of sodium hydroxide on the gelatinization temperature of starch in a typical carpet adhesive formulation.

Carboxylated SBR latex was blended with a slightly acid modified granular corn starch (Clinton 155B) in the ratio of 80/20 by weight of solids. Whiting filler was added at 400 phrs and the total solids adjusted to 71%. Various amounts of sodium hydroxide were added as noted in Table III.

Several one millileter portions of these compounds were placed in vials and immersed in a water bath. The temperature of the bath was increased at the rate of 0.2° C/min. and one vial of each compound removed from the bath at each degree and immediately quenched with several volumes of cold water. Each sample was further diluted for ease of examination in a polarizing microscope. The minimum temperature was noted at which the first few starch granules were gelatinized, as revealed by the loss of birefringence and the disappearance of the typical polarization cross characteristic of crystalline starch granules. The temperature at which half of the granules were gelatinized was noted as the mid-point. The lowest temperature at which all of the starch granules were gelatinized was also noted. These temperatures are listed as the initial, mid-point, and final gelatinization temperatures in Table III.

TABLE III
Microscopic Gelation Temperatures of Chemically Sensitized Latex Starch Filler Formulations

| Compound | NaOH (phs) | Gelation Temperature ° C | | | |
|---|---|---|---|---|---|
| | | Initial | Mid-Point | Final | Range |
| 1 | — | 64 | 69.5 | 73 | 9 |
| 2 | 2.0 | 67 | 70 | 75 | 8 |
| 3 | 4.0 | 66 | 69 | 76 | 10 |
| 4 | 5.0 | 59 | 65 | 71 | 12 |
| 5 | 6.0 | 58 | 64 | 73 | 15 |

It will be noted that at the lower concentrations of sodium hydroxide, the gelatinization temperature is actually increased in these particular formulations, relative to the untreated starch formulation 1. However the mid-point is little affected. At higher concentrations, the initial gelatinization temperature and mid-point are substantially reduced.

EXAMPLE IV

Formulations were prepared as in Example III except that various combinations of sodium hydroxide, borax decahydrate, and urea were added, as noted in Table IV. The initial and final gelatinization temperatures of the starch in these formulations are noted in the table.

TABLE IV
Microscopic Gelation Temperatures of Chemically Sensitized 80/20 Latex/Starch Formulations - 400 phrs Whiting - 71% T.S.

| Compound | NaOH (phs) | Borax (phs) | Urea (phs) | Gelation Temp. ° C | | |
|---|---|---|---|---|---|---|
| | | | | Initial | Final | Range |
| 1 | — | — | — | 64 | 73 | 9 |
| 2 | 4 | — | — | 66 | 76 | 10 |
| 3 | 6 | — | — | 58 | 73 | 15 |
| 4 | — | 10 | — | 63 | 69 | 6 |
| 5 | — | 20 | — | 61 | 66 | 5 |
| 6 | — | — | 10 | 63 | 68 | 5 |
| 7 | — | — | 20 | 63 | 68 | 5 |
| 8 | — | 20 | 20 | 61 | 65 | 4 |
| 9 | 4 | — | 10 | 67 | 76 | 9 |
| 10 | 4 | — | 20 | 67 | 76 | 9 |
| 11 | 6 | — | 10 | 67 | 77 | 10 |
| 12 | 6 | — | 20 | 66 | 75 | 9 |
| 13 | 4 | 10 | — | 61 | 73 | 12 |
| 14 | 4 | 20 | — | 59 | 72 | 12 |
| 15 | 6 | 10 | — | 58 | 71 | 13 |
| 16 | 6 | 20 | — | 58 | 70 | 12 |
| 17 | 4 | 10 | 10 | 60 | 71 | 11 |
| 18 | 4 | 20 | 20 | 58 | 66 | 8 |
| 19 | 6 | 10 | 10 | 56 | 70 | 14 |
| 20 | 6 | 20 | 20 | 58 | 67 | 9 |

It will be noted that borax alone (Compound 5) lowers the gelatinization temperature; that sodium hydroxide and borax together are more effective than either one alone (Compounds 13 through 16 vs. 2 through 5); and that in combination with urea (Compounds 18 and 20) that both the initial and final gelatinization temperatures are lowest of all the formulations in the series.

EXAMPLE V

This Example illustrates the effect of various proportions of starch sensitizers on the cohesiveness of textile composites.

Carpet laminates were prepared as described in Example I using the latex-starch compositions set forth in Table V below.

TABLE V
Effect of Proportions of Starch Sensitizers on Cohesiveness of Textile Composite

| Composite | Composition* | | | | | Bond Strength (lbs./3 in.) |
|---|---|---|---|---|---|---|
| | Latex (phrs) | Starch** (phrs) | Sensitizer (phs) | | | |
| | | | NaOH | Borax | Urea | |
| 1 | 92 | 8 | 0 | 23 | 13 | 11.3 |
| 2 | 90 | 10 | 4 | 9 | 0 | 13.5 |
| 3 | 90 | 10 | 5 | 9 | 0 | 17.5 |
| 4 | 90 | 10 | 6 | 9 | 0 | 15.7 |
| 5 | 90 | 10 | 5 | 17 | 0 | 17.9 |
| 6 | 90 | 10 | 6 | 17 | 0 | 17.0 |
| 7 | 82 | 18 | 0 | 16 | 0 | 10.7 |
| 8 | 80 | 20 | 4 | 4 | 0 | 13.8 |
| 9 | 80 | 20 | 4 | 14 | 0 | 16.8 |

*350 phrs of whiting and sufficient water and polyacrylate thickener were added to each sample to obtain 71% total solids and a viscosity of 13 to 14,000 cps. therein.
**Acid modified starch (Clinton 155-B manufactured by Clinton Corn Processing Company)

The above table shows that, in general, the cohesiveness of a textile composite is improved at increasing levels of NaOH and that, under the particular drying conditions utilized, in the absence of sodium hydroxide the desired degree of cohesiveness is not obtained. Composite 1 is an example of U.S. Pat. No. 3,779,857 while Composite 7 is an example of U.S. Pat. No. 4,055,694. All other composites contain sodium hydroxide and have superior bond strength.

EXAMPLE VI

This Example illustrates the effect of pretreating textile composites to increase the cohesiveness thereof.

Carpet and fabric laminates were prepared as described in Example I with the latex-starch composites set forth in Table VI below. One-half of the laminate samples were dried for 15 minutes in a circulating air oven at an air temperature of 140° C. The other samples were subjected to a steam atmosphere for 15 minutes at 100° C in an autoclave to maintain sufficient water in the samples for gelation of the starch when it reaches its gelation temperature and then dried in the same manner as the other samples. The cohesive strength of the samples was determined and is shown in Table VI below:

TABLE VI

Comparison of Laminate Cohesiveness
Normal Drying vs. Steaming Prior to Drying

| Composite | Latex (phrs) | Composition* Starch** (phrs) | Borax (phs) | Bond Strength Unsteamed | Steamed |
|---|---|---|---|---|---|
| | | Fabric Laminates | | lbs./1 inch strip | |
| 1 | 100 | 0 | 0 | 3.8 | 3.6 |
| 2 | 90 | 10 | 11 | 3.5 | 4.0 |
| 3 | 80 | 20 | 5 | 3.2 | 4.7 |
| | | Carpet Laminates | | lbs./3 inch strip | |
| 4 | 100 | 0 | 0 | 10.8 | 10.9 |
| 5 | 90 | 10 | 11 | 10.7 | 11.6 |
| 6 | 80 | 20 | 5 | 9.7 | 11.6 |

*350 phrs whiting and sufficient water and polyacrylate thickener were added to each sample to obtain 71% total solids and a viscosity of 13 to 14,000 cps.
**Acid modified starch (Clinton 155-B manufactured by Clinton Corn Processing Company)

The above data show the effect of heating laminates under conditions which allow little or no water loss during gelatinization (steamed column vs. unsteamed). Also that with less than optimum chemical sensitization, lower bond strength results as the starch is increased when the laminate is dried in a typical laboratory circulating air oven (unsteamed bonds for composites 2 and 3 vs. 1, or 5 and 6 vs. 4); however, when dried under conditions which permit little or no moisture loss, strong T-peel bond strengths are produced. Furthermore, it is observed that steaming does not produce this reinforcement in the absence of starch (steamed vs. unsteamed bonds for composites 1 and 4). Similar results are obtained with textile laminates and carpet laminates.

EXAMPLE VII

This Example illustrates the effect of the period of pretreating textile composites on the cohesiveness of the resulting composite. It shows the quicker gelatinization of starch with addition of chemical gelation sensitizers, resulting in higher bond strength of the dried laminate.

Fabric laminates were prepared with the latex-starch compositions set forth in Table VII. The laminates were heated for 90 seconds in a circulating air oven at 140° C. and then were placed between two aluminum plates which were positioned in the oven. At various periods the laminates were removed from between the plates and dried for the remainder of the 15 minutes in the oven. The purpose of the plates was to reduce evaporation of moisture and thus provide sufficient water to insure gelatinization of the starch. The cohesiveness of each of the laminates was determined and is reported in Table VII below:

TABLE VII

Effect of Moisture Control During Early Stages of Drying on Cohesiveness of Textile Composite

| Composite | Composition* Latex (phrs) | Starch** (phrs) | NaOH (phs) | Borax (phs) | Bond Strength (lbs./in.) 0 Sec. | 7 Sec. | 15 Sec. | 30 Sec. | 60 Sec. |
|---|---|---|---|---|---|---|---|---|---|
| 1 | 100 | 0 | 0 | 1 | 6.2 | — | 6.1 | — | — |
| 2 | 82 | 18 | 0 | 2.8 | 5.3 | 6.1 | 6.2 | 6.4 | 6.7 |
| 3 | 80 | 20 | 4.0 | 0.8 | 5.7 | 6.5 | 6.6 | 6.8 | 6.4 |

*400 phrs whiting and sufficient water were added to each sample to obtain 71% solids therein. Polyacrylate thickener was also added to each composite to obtain therein a viscosity of 13 to 14,000 cps.
**Acid modified starch (Clinton 155-B manufactured by Clinton Corn Processing Company)

From the above table, it is seen that the textile composites which contained starch had better cohesiveness than the samples which did not and also that the utilization of NaOH as the starch sensitizer resulted in improved cohesiveness in a shorter period.

EXAMPLE VIII

This example illustrates the utilization of carboxylated acrylonitrile butadiene styrene and butyl acrylateacrylonitrile latices for forming a textile composite of the present invention.

Acrylonitrile/butadiene/styrene/itaconic acid polymer (20/50/27.5/2.5) and butyl acrylate/acrylonitrile/methylolacrylamide polymer (85/15/5) latices were prepared by emulsion polymerization techniques well known in the art.

Fabric laminates were prepared with the latex starch composition set forth in Table VIII and the laminates pretreated for 30 seconds according to the procedure described in Example VII. Other laminates were not treated but simply dried in a circulating air oven at 140° C for 15 minutes. The cohesiveness of each of the laminates was determined and is reported in Table VIII below:

TABLE VIII

Comparison of Laminate Cohesiveness
Normal Drying vs. Steaming Prior to Drying

| Latex Polymer | Acrylonitrile- Butadiene Styrene | | | Butylacrylate- Acrylonitrile | | | |
|---|---|---|---|---|---|---|---|
| Composite* | 1 | 2 | 3 | 4 | 5 | 6 | 7 |
| Latex Polymer (phrs) | 100 | 80 | 80 | 100 | 80 | 80 | 80 |
| Starch (phrs)** | 0 | 20 | 20 | 0 | 20 | 20 | 20 |
| Borax (phs) | 0 | 15 | 0 | 0 | 0 | 10 | 0 |
| Urea (phs) | 0 | 15 | 0 | 0 | 0 | 0 | 20 |
| NaOH (phs) | 0 | 0 | 2 | 0 | 0 | 0 | 0 |
| Bond Strength (Pretreated (lbs./in.) | 6.6 | 6.6 | 5.9 | 5.3 | 5.6 | 5.2 | 5.8 |
| Bond Strength (Untreated (lbs./in.) | 6.4 | 5.4 | 5.4 | 5.6 | 4.8 | 4.4 | 4.7 |
| % Increase from Pretreatment | 3 | 22 | 9 | 5 | 17 | 18 | 23 |

*400 phrs whiting, sufficient water, and polyacrylate thickener were added to each sample to obtain 71% total solids and a viscosity of 13 to 14,000 cps.
**Acid modified starch (Clinton 155B manufactured by Clinton Corn Processing Company)

It is seen from the above table that in all cases where the composites were pretreated to provide sufficient moisture therein during heating so as to insure substantially complete gelatinization of the starch, the cohesiveness of the resulting composite was improved.

EXAMPLE IX

This Example illustrates the interaction of starch with whiting to impart improved strength to textile composites.

Laminates were prepared by coating fabric with about 16 oz./sq. yd. of the latex-starch compositions set forth in Table IX below. Sufficient polyacrylate thickener was added in each case to obtain a viscosity of 13 to 14,000 cps. Sufficient water was added to obtain 71% total solids. One-half of the laminate samples were dried for 15 minutes in a circulating air oven at an air temperature of 140° C. The other samples were pretreated in accordance with the procedure described in Example VII for 45 seconds and then dried for 15 minutes in the oven.

TABLE IX

Interaction of Starch with Filler

| Latex/Starch*** (phrs) | NaOH (phs) | Borax (phs) | Filler (phrs) | | | | |
|---|---|---|---|---|---|---|---|
| | | | 300 | 350 | 400 | 450 | 500 |
| Normal Oven Drying | | | | | | | |
| Bond Strength lbs./in. | | | | | | | |
| 100/0 | * | ** | 8.4 | 7.7 | 6.6 | 6.1 | 5.8 |
| 80/20 | 4 | 4 | 6.9 | 6.1 | 5.5 | 5.4 | 4.8 |
| 60/40 | 1.5 | 1.5 | 5.3 | 5.0 | 4.6 | 4.2 | 4.3 |
| 40/60 | 0.67 | 0.67 | 4.3 | 3.8 | 3.5 | 3.5 | 3.1 |
| Heated with Moisture Retained 45 sec. - Then Oven Dried | | | | | | | |
| Bond Strength lbs./in. | | | | | | | |
| 100/0 | * | ** | 8.2 | 7.3 | 6.3 | 5.7 | 4.4 |
| 80/20 | 4 | 4 | 8.3 | 7.5 | 6.8 | 6.3 | 5.6 |
| 60/40 | 1.5 | 1.5 | 7.7 | 6.6 | 6.4 | 6.2 | 5.9 |
| 40/60 | 0.67 | 0.67 | 7.3 | 6.8 | 7.1 | 6.3 | 5.8 |
| % Change Due to Moist Heat | | | | | | | |
| 100/0 | * | ** | −2% | −5% | −5% | −7% | −24 |
| 80/20 | 4 | 4 | +20 | +23 | +25 | +17 | +17 |
| 60/40 | 1.5 | 1.5 | +44 | +32 | +39 | +48 | +37 |
| 40/60 | 0.67 | 0.67 | +70 | +79 | +103 | +80 | +87 |

* 1 phr NaOH
** 1 phr Borax
***Acid modified starch (Clinton 155B manufactured by Clinton Corn Processing Co.)

The above table shows that when composites are subjected to conditions to insure substantially complete gelatinization of starch, greatly increased cohesiveness resulted. Also, it is seen that at whiting levels above 350 phrs, reinforcement of the latex by starch is observed. That is, the strength of the composites which were subjected to conditions to ensure complete gelatinization of the starch was greater than for the composites which consisted entirely of latex at the same filler level.

EXAMPLE X

This Example illustrates the improved pile anchor of precoat carpets prepared with a latex-starch composition.

A carboxylated butadiene-styrene latex was prepared by the method disclosed in Example I and water and 500 phrs whiting were added to obtain a solids level of 71%. The composition was thickened to 13 to 14,000 cps with polyacrylate thickener.

The backs of tufted carpets were coated with 22 oz./sq. yd. (dry basis) of the latex composition set forth in Table X. One set of the coated carpets was dried in a circulating air oven for 15 minutes at an air temperature of 168° C. The other set of coated carpets was pretreated by exposure to a steam atmosphere for 1 minute and then dried as the previous set. The pile anchor values of the precoated carpets was determined and are set forth in Table X.

TABLE X

Effect of Moisture Control During Early Stages of Drying on Cohesiveness of Precoat Carpet

| Composite | Latex (phrs) | Starch (phrs) | NaOH (phs) | Borax (phs) | Pile Anchor (lb.s/tuft) | |
|---|---|---|---|---|---|---|
| | | | | | Pretreated | Normal Drying Conditions |
| 1 | 100 | 0 | * | ** | 12.6 | 10.4 |
| 2 | 70 | 30 | 4.0 | 2.3 | 14.6 | 11.6 |
| 3 | 70 | 30 | 6.0 | 2.3 | 14.4 | 12.0 |
| 4 | 40 | 60 | 2.0 | 0.67 | 12.2 | 9.3 |
| 5 | 40 | 60 | 5.0 | 0.67 | 14.4 | 12.7 |

*1.2 phr NaOH
**1.0 phr Borax

EXAMPLE XI

This Example demonstrates that by selection of a starch derivative with sufficiently low gelation temperature, that the maximum bond strength can be achieved without the use of added gelation sensitizers or modification of the normal drying process.

A series of latex-starch compositions were prepared containing 60 phrs carboxylated butadiene-styrene latex, 40 phrs of various derivitized corn starches as described in Table XI and 500 phrs whiting with sufficient water and polyacrylate thickener to obtain 73% total solids and a viscosity of 14 to 15,000 cps.

Samples of each composition were heated to various temperatures in vials in a water bath and the percent of starch gelatinized was measured at each temperature as described in Example III. The percent of starch gelatinized at 55° C is listed in Table XI. The estimated minimum temperature for gelatinization of all starch granules is also listed in Table XI as the Final Gelatinization Temperature.

Fabric laminates were prepared with each composition and half were pretreated as described in Example VII and left between the aluminum plates for a period of 30 seconds. The other half were not pretreated but simply dried in a circulating air oven at 140° C for 15 minutes. Bond strengths were measured as reported in Table XI.

TABLE XI

Effect on Fabric Bonds of Gelation Temperature of Derivitized Corn Starches

| Starch Derivative | | Final Gelation Temp. °C | % Gelatinized at 55° C | Bond Strength (lbs./in.) | | |
|---|---|---|---|---|---|---|
| | | | | Presteamed | Normal Drying | .% |
| Acid | Modified | 76 | 0 | 3.2 | 2.5 | 78 |
| 5.5% | Cyanoethylated | 64 | 14 | 3.5 | 2.4 | 69 |
| 7% | Cyanoethylated | 63 | 24 | 3.3 | 2.5 | 76 |
| 6% | Propoxylated | 60 | 48 | 3.9 | 2.7 | 69 |
| 5.8% | Ethoxylated | 61 | 46 | 3.6 | 3.0 | 83 |
| 7.9% | Ethoxylated | 56 | 90 | 3.5 | 3.5 | 100 |

The above table shows that, under the conditions of this experiment, the maximum bond strength is achieved without special drying conditions or additives if over half and preferably all of the starch is gelatinized by 55° C.

What is claimed is:

1. A method of forming a textile composite comprising (A) forming an aqueous latex composition consisting essentially of (1) from about 30 to about 90 phrs latex and (2) from about 70 to about 10 phrs granular starch, (B) applying said aqueous latex composition to a fabric substrate to form a textile composite and then (C) treating said textile composite to increase bonding strength by producing uniform and substantially complete gelatinization of the starch at the interface with the substrate as well as throughout the latex composition by increasing the temperature of the textile composite to above the gelatinization temperature of the starch while retaining sufficient moisture in the composition to gelatinize the starch by maintaining said gelatinization temperature until substantially complete gelatinization is produced and finally (D) completely drying the textile composite having improved bonding strength.

2. The method of forming a textile composite according to claim 1 wherein (A) has added at least one starch gelation sensitizer to effect the lowering of the gelatinization temperature of said granular starch to produce substantially complete gelatinization of the starch.

3. The method of forming a textile composite according to claim 1 wherein (A) has added from about 10 to about 40 phrs starch on a dry basis.

4. The method of forming a textile composite according to claim 1 wherein (A) has added up to about 800 phrs filler on a dry basis.

5. The method of forming a textile composite according to claim 4 wherein (A) has added from about 150 to about 600 phrs filler on a dry basis.

6. The method of forming a textile composite according to claim 2 wherein the amount of starch gelation sensitizer added ranges from about 1 to about 20 phs.

7. The method of forming a textile composite according to claim 6 wherein the starch gelation sensitizer comprises sodium hydroxide.

8. The method of forming a textile composite according to claim 7 wherein the sodium hydroxide is added prior to the addition of at least one other starch gelation sensitizer.

9. A method of forming a textile composite comprising (A) forming an aqueous latex composite consisting essentially of (1) from about 40 to about 90 phrs latex, (2) from about 60 to about 10 phrs granular starch (3) from about 1 phs to about 20 phs of at least one starch gelation sensitizer and (4) from about 150 phrs to about 800 phrs filler, (B) applying said aqueous latex composition to a fabric substrate to form a textile composite and then (C) treating said textile composite to increase bonding strength by producing uniform and substantially complete gelatinization of the starch at the interface with the substrate as well as throughout the latex composition by increasing the temperature of the textile composite to above the gelatinization temperature of the starch while retaining sufficient moisture in the composition to gelatinize the starch until substantially complete gelatinization is produced and finally (D) completely drying said textile composite having improved bonding strength.

10. The method of forming a textile composite according to claim 9 wherein the starch gelation sensitizer is selected from the group consisting of sodium hydroxide, urea, and borax.

11. The method of forming a textile composite, according to claim 1 wherein said fabric substrate comprises a primary layer and a secondary layer bonded together by (A) in the forming of the textile composite.

12. A textile composite formed by the process of claim 1.

13. A textile composite formed by the process of claim 11.

14. The textile composite according to claim 12 wherein (A) has added up to about 800 phrs filler on a dry basis.

15. The textile composite according to claim 13 wherein (A) has added up to about 800 phrs filler on a dry basis.

* * * * *